United States Patent Office 3,274,048
Patented Sept. 20, 1966

3,274,048
RAPID SETTING ADHESIVE COMPOSITIONS
Walter B. Armour, Plainfield, and Walter C. Kania, Colonia, N.J., assignors to National Starch and Chemical Corporation, New York, N.Y., a corporation of Delaware
No Drawing. Filed Aug. 22, 1962, Ser. No. 218,515
8 Claims. (Cl. 161—184)

This invention relates to the preparation of novel, rapid setting adhesive compositions and to the adhesives thus prepared.

It is the object of this invention to provide stable, thermosetting adhesive compositions for the bonding of both porous and non-porous substrates, said adhesives being characterized by their ability to rapidly set, at ambient temperatures, with either wet combining or dry combining techniques. A further object of this invention involves the preparation of adhesives capable of yielding waterproof, high strength bonds which are suitable for exterior applications.

As is known in the art, modern adhesives are prepared from a wide variety of synthetic organic resins, many of which are often blended so as to provide adhesive compositions displaying specific properties desired by the practitioner. Most adhesives are ordinarily classified as being either thermoplastic or thermosetting. Thus, thermosetting adhesives are formulated with resins which, by means of a chemical reaction solidify or set on heating and cannot be remelted on further heating. Thermoplastic adhesives, on the other hand, are made with resins which may be softened by heat, and then regain their original properties upon cooling.

Among the resins which are used for the preparation of thermosetting adhesives, one may list resorcinol-formaldehyde, melamine-formaldehyde, phenol-formaldehyde, and urea-melamine resins. One of the major disadvantages of the thermosetting adhesives derived from such resins is that the substrates to which they are applied must be wet combined; that is, the adhesive coated substrates must be brought into contact while the adhesive films are still wet or moist. Moreover, wet combining must also be accompanied by the application of pressure. Thus, typical pressing cycles for the wet combining of thermosetting adhesive coated substrates involve the application of about 100–200 pounds per square inch (p.s.i.) for a period of from 8 to 24 hours at room temperature conditions or for about 10 to 15 minutes at temperatures in the range of 200°–300° F.

Although wet combining presents few disadvantages in some applications, there are many situations wherein it proves to be a distinct limitation. Obviously, the ability to bond substrates having a dry coating of a previously applied adhesive film would prove to be extremely useful to the practitioner. However, such dry combining techniques cannot be utilized with the majority of the resins presently employed in thermosetting adhesives.

Polyvinyl acetate along with various vinyl acetate copolymers are often employed in the preparation of thermoplastic adhesive compositions. Such adhesives have proven useful for the bonding of porous substrates, such as wood, paper, and leather, intended for use in applications which do not require extensive water resistance. However, when attempts are made to use these adhesives for exterior applications, it is found that the bonds which are obtained with these materials are usually lacking in water resistance. This property is, of course, required for its use in the bonding of substrates which are to be exposed to the excessive moisture and varying temperature conditions encountered during outdoor exposure.

In an attempt to improve the strength and water resistance of the bonds which are obtained with adhesives derived from polyvinyl acetate and its copolymers, they have been combined with various thermosetting materials such as the phenol-formaldehyde resins, etc. Although the water resistance of these combinations is superior to that of ordinary polyvinyl acetate adhesives, they are still not entirely adequate for use in exterior applications.

The present invention provides novel adhesive compositions comprising combinations of a polyvinyl acetate copolymer with certain reactive materials. These adhesives overcome all of the deficiencies found in the previously employed combinations of this type, making it possible for the practitioner to use them with wet combining as well as with dry combining techniques at ambient temperatures, i.e. 72° F. while yielding adhesive bonds which display exceptional strength and a high degree of water resistance which is unaffected by outdoor exposure. A surprising feature on the part of the adhesives of our invention is the rapidity with which they are set or cured with either the wet combining or dry combining techniques.

In brief, the adhesive compositions of our invention comprise aqueous mixtures of an emulsion copolymer of vinyl acetate with a comonmer selected from the group consisting of glycidyl acrylate and glycidyl methacrylate together with a reactive material selected from the class consisting of trimethylol phenol, resorcinol, B-stage resorcinol-formaldehyde resins, B-stage resorcinol formaldehyde resins blended with trimethylol phenol, and reactive bark derivatives containing water soluble sulfonate salts of hydroxy aromatic polymeric compounds as prepared by means of the procedure given in U.S. Patent No. 2,999,108.

The vinyl acetate copolymers which are utilized in the adhesives of our invention may be selected from the class consisting of copolymers of vinyl acetate with glycidyl acrylate or with glycidyl methacrylate. Hereinafter, whenever reference is made to vinyl acetate:glycidyl acrylate copolymers, it is to be understood that said reference also comprehends vinyl acetate:glycidyl methacrylate copolymers.

The above described emulsion copolymers may be prepared by employing any of the aqueous emulsion polymerization techniques well known to those skilled in the art. These techniques generally involve the reaction of an aqueous emulsion of the respective monomers in the presence of a free radical type catalyst.

The reaction is usually conducted, under agitation, at reflux temperatures in the range of from 65° to 80° C. For best results and for maximum homogeneity of the resulting copolymers, an advisable procedure is the continuous, slow addition of the monomeric glycidyl acrylate to the reaction vessel containing the emulsified vinyl acetate monomer. The reaction is completed when the reflux temperature has exceeded 90° C. In most cases, the reaction will require from 3 to 6 hours with the exact time depending upon the particular catalyst and the concentration in which it is used, the reaction temperature, the ratio of the monomers, as well as the particular polymerization technique which is employed. After the polymerization reaction is substantially completed, the product is cooled and its pH may then be adjusted to a level of from 3 to 6 by the addition of a volatile base such as ammonia.

For use in our adhesive compositions these copolymers may ordinarily contain from 0.1% to 10%, by weight, of glycidyl acrylate, although optimum results are obtained with emulsions wherein these copolymers contain from about 2% to 4%, by weight, of glycidyl acrylate. The total copolymer resin solids content of these emulsions will ordinarily be in the range of approximately 40% to 60%, by weight.

The reactive material which is combined with the above described ViAc:glycidyl acrylate emulsion copolymers in preparing our adhesive compositions may be selected from any of the above listed materials although we have found that excellent results are obtained with trimethylol phenol. When used in the compositions of our invention, these reactive materials are introduced in the form of aqueous systems such as solutions or dispersions. All of these reagents may be broadly described as low molecular weight compounds containing one or more methylol groups.

In preparing our adhesive compositions, it is merely necessary to combine the aqueous ViAc:glycidyl acrylate copolymer emulsion with the selected reactive material. The resulting formulations are found to be extremely stable and may be stored for prolonged periods with no danger of any premature curing or other spoilage.

Prior to the actual use of our adhesives, it is helpful to introduce a catalyst into the formulation so as to accelerate the curing or crosslinking of the adhesive coatings or films which are derived therefrom as well as to enhance the properties of these coatings and films. Among the catalysts which may be utilized for the curing of our adhesive compositions are types both organic and mineral, i.e. inorganic acids such as hydrochloric, nitric, sulfuric, paratoluene sulfonic, acetic, benezene sulfonic, and trichloroacetic acids; and preferably acid salts such as chromic nitrate, zinc nitrate, manganese nitrate, aluminum nitrate, and other transition metal salts, ammonium paratoluene sulfonate, ammonium dihydrogen phosphate, aluminum chloride, ammonium nitrate, and chromic complexes such as para-aminobenzoatochromic chloride. These catalysts may be added to our adhesive at the time they are to be used, or, if added earlier, they should not be introduced any sooner than about 24 hours prior to their actual use of these adhesives. As has been noted, the use of acid catalysts, and particularly chromic nitrate, is preferred, since the use of these materials as catalysts accelerates the curing of our compositions to a greater degree than is obtained by the use of free acids.

With regard to proportions, our adhesive compositions may contain from 0.1% to 80%, by weight, of one of the above described reactive materials in admixture with from 20% to 99.9%, by weight, of ViAc:glycidyl acrylate copolymer resin solids. The total solids content of our compositions, i.e. reactive material plus ViAc:glycidyl acrylate resin solids, is usually in the range of from 30% to 60%, by weight, with the balance of the formulation being water. The amount of acid catalyst which can be used may range from about 0.1-10.0 parts of catalyst per hundred parts of total solids, as defined above. Optimum results are obtained with compositions containing approximately 18%, by weight, of a reactive material, approximately 82%, by weight, of ViAc:glycidyl acrylate copolymer resin solids, and, where desired, about 5.0 parts of catalyst per 100 parts of the combined weight of the reactive material and the ViAc:glycidyl acrylate copolymer resin solids.

Our adhesives may be used in the bonding, saturation or lamination of many types of porous substrates such as wood, tempered hardboard, textiles, leather, paper, cement asbestos board and related products, as well as for the manufacture of such products as plywood and wood particle board. One application for which our adhesives have proven to be particularly useful is for the bonding of so called "finger joints." These finger joints are employed in the lumber industry where it is desirable to make use of the smaller sections of wood that would normally be impractical to use. This can now be accomplished by joining these smaller sections with adhesives and a common procedure for this purpose involves the cutting of the mating edges of the lumber into interlocking, mating fingers which are subsequently glued together.

Another interesting application for our adhesives involves their use in the construction of laminated beams for arches and other supporting structures wherein lumber is laminated so as to obtain the desired dimensions of the final beam. Our adhesives may also be used in the construction of so called "curtain wall panels." These panels comprise prefabricated wall panels which are made by binding skin materials such as metals, cardboard, plywood, glass and asbestos board, etc. to cores such as foamed plastics, honeycomb cores, insulation board and particle board, etc.

When adhering substrates coated with our compositions, the practitioner may employ either wet or dry combining techniques. When wet combining methods are used, the freshly coated substrates may be adhered at room temperature, under pressures of from 30-300 p.s.i. which are applied for periods of from ½-3 hours. By increasing the temperature, both the pressure and the press time will, of course, be reduced proportionately. When dry combining techniques are used, the substrates having dry adhesive films, derived from the compositions of our invention, may be adhered under pressures in the range of 50 to 200 p.s.i., which are applied for periods of from one second to 2 minutes at temperatures of approximately 72° to 250° F. Corresponding reductions in pressures and press times are again achieved by increasing the temperatures.

With either wet or dry combining techniques the adhesive bonds developed with the products of our invention are found to possess exceptionally high strength and outstanding resistance to water. Our adhesives may thus be employed in all applications, including those requiring outdoor exposure and/or a high degree of water resistance.

The following examples will further illustrate the embodiment of our invention. In these examples all parts given are by weight unless otherwise noted.

*Example I*

This example illustrates the preparation of the adhesives of our invention and also demonstrates the high quality of the adhesive bonds which are obtained through their use.

In preparing a typical adhesive composition of our invention, we blended 100 parts of a 92:2 ViAc:glycidyl acrylate copolymer emulsion containing 50%, by weight, of resin solids with 17.5 parts of a 70%, by weight, aqueous solution of trimethylol phenol. The resulting formulation was found to be extremely stable as samples were maintained for periods of up to 12 weeks without any evidence of gelation or other deterioration. Immediately prior to its use, we added 5 parts of a 50%, by weight, aqueous solution of chromic nitrate to 100 parts of the above described adhesive mixture. The catalyzed adhesive was then applied, in a 6 mil wet film, to one surface of a number of $\frac{1}{16}''$ thick birch wood veneers. Three of these veneers were then compressed for three hours under a pressure of 75 p.s.i., and a temperature of 75° F. so as to result in the formation of a three ply panel, part of which was then cut into $1'' \times 3\frac{1}{4}''$ test specimens which were, of course, $\frac{3}{16}''$ thick. These specimens were then aged for seven days prior to their being subjected to the tests described below.

In order to demonstrate the strength and water resistance of our adhesive bonds, a number of these $1'' \times 3\frac{1}{4}'' \times \frac{3}{16}''$ 3 ply specimens were immersed in boiling water for four hours whereupon they were placed in a drying oven set at a temperature of 145° F. for a period of 20 hours. They were then immersed in boiling water for an additional four hours after which the water was cooled to 72° F. by the addition of cold water. While still wet, the tensile shear strength, in p.s.i., of the adhesive bonds of these plywood test specimens was determined using an Instron Tensile Tester at a rate of shear of 0.2 inch per minute. Following the tensile shear strength determinations, the test specimens were examined so as to determine their percent of wood failure. The percent of wood failure indicates what percentage of the total area of the wood surface, at the interface with the adhesive film, was torn while being subjected to the tensile shear determination. Thus, a high percentage of wood failure indicates a strong adhesive bond since the wood rather than the adhesive bond has been torn.

The results of these tests were as follows:

Tensile shear strength _____ p.s.i__ 394
Average percent wood failure _____ 100
Minimum percent wood failure _____ 100

The above described test procedure conforms to the cyclic boil test for type I hardwood plywood as established by the U.S. Department of Commerce commercial standard CS35–56 which is used to evaluate commercial grades of hardwood plywood and is also used in setting up adhesive requirements for applications other than plywood, i.e. curtain wall panels, finger joints, and laminated beams, etc. The standards established for this test set up the following scale for comparing the percent wood failure for a specific range of tensile shear strengths:

| Tensile Shear Strength (p.s.i.) | Minimum Percent Wood Failure | Average Percent Wood Failure |
| --- | --- | --- |
| Under 250 | 25 | 50 |
| 250–350 | 10 | 30 |
| Above 350 | 10 | 15 |

Thus, it is to be noted that the average percent wood failure which was obtained with the plywood specimens bonded with our adhesive far exceeded both the minimum and average standards for this type of product.

The remainder of the 3 ply panel, whose preparation is described above, was then cut into 6″ x 6″ test specimens which were, of course, 3/16″ thick. These specimens were aged for seven days and then subjected to 15 test cycles as described in the cold soak test for type II hardwood plywood as established by the U.S. Department of Commerce commercial standard CS35–56. Each of these cycles required the immersion of the plywood specimens for four hours in water which was at a temperature of 72° F., followed by air drying, at the same temperature, for a period of 20 hours. According to the standards established for this test, a satisfactory specimen must pass 10 of the 15 cycles without any visible delamination between any two layers of veneer which is greater than 2″ in continuous length and over 1/8″ in depth at any point. We obtained results wherein 100% of the specimens tested passed all of the 15 test cycles without any visible signs of delamination. These results indicate the high strength of our adhesive bonds.

Example II

This example again illustrates the preparation of the adhesives of our invention and also demonstrates the high quality of the adhesive bonds which are obtained through their use.

In preparing this particular composition, we blended 1000 parts of an 96:5 ViAc:glycidyl methacrylate emulsion containing 50%, by weight, of resin solids with 70 parts of a 70%, by weight, aqueous solution of trimethylol phenol. The resulting formulation was found to be stable as samples were maintained for periods of up to sixteen weeks without any evidence of gelation or other deterioration. Immediately prior to the use of this formulation we added 5 parts of a 50%, by weight, aqueous solution of chromic nitrate to 100 parts of the above described mixture. This catalyzed adhesive was then used to prepare 3 ply birch wood plywood by means of the procedure described in Example I.

The adhesive bonds of the resulting plywood displayed high strength and excellent water resistance. Thus, for example, when samples of the birch wood plywood were subjected to the cyclic boil test for type I hardwood plywood and to the cold soak test for type II hardwood plywood, according to the U.S. Department of Commerce commercial standard CS35–56 (see Example I for descriptions of these test procedures), the following results were obtained:

Cyclic boil test:
   Tensile shear strength (p.s.i.) _____ 265
   Percent wood failure _____ 100
Cold soak test: Passed 15 cycles without delamination.

In two repetitions of the above procedure, comparable 3 ply birch wood plywood was prepared using adhesive compositions which were identical to that described above with the exception that in one instance we used a 99.9:0.1 ViAc:glycidyl methacrylate aqueous copolymer emulsion containing 50%, by weight, of resin solids rather than the 90:10 copolymer.

In still another repetition of the above described procedure, the chromic nitrate catalyst was not added to the adhesive formulation. In this case the pressing cycle employed for the preparation of the 3 ply birch wood plywood involved the compression of the veneers for twenty minutes at a temperature of 300° F. The properties of the resulting plywood were again comparable to those described above.

Example III

This example illustrates the use of our adhesive compositions in a dry combining technique and also demonstrates their rapid setting properties.

We blended 100 parts of a 98:2 ViAc:glycidyl acrylate copolymer emulsion containing 50%, by weight, of resin solids with 17 parts of a 70%, by weight, of an aqueous solution of trimethylol phenol and 0.5 part of a 50%, by weight, aqueous solution of chromic nitrate. A 1/64″ wet film of this formulation was spread on the opposing surfaces of two 6″ x 6″ x 1/16″ sheets of birch wood plywood. These films were allowed to air dry at 75° F. for a period of two hours. The adhesive coated plywood sheets were then placed together and pressed, at 250° F., for a period of only one minute. Excellent bonding was obtained as was evidenced by the fact that the laminate required tearing of the wood in order to separate the two sheets. Moreover, after aging for one week the water resistance of this laminate was well beyond the minimum standards established for the cyclic boil test for type I hardwood plywood as well as for the cold soak test for type II hardwood plywood as described in Example I.

Example IV

This example compares the water resistance of the films derived from our adhesive compositions with that of the films derived from a polyvinyl acetate homopolymer emulsion and also from a vinyl acetate copolymer emulsion, both of which were combined with the same reactive material used in our formulation.

Below are listed the adhesives which were compared:

| Formulation | Parts | | |
| --- | --- | --- | --- |
| | #1 | #2 | #3 |
| A polyvinyl acetate homopolymer aqueous emulsion with a resin solids content of 50%, by weight | 80.0 | | |
| A 98:2 vinyl acetate:cyanoethyl half ester of maleic acid aqueous emulsion copolymer having a resin solids content of 50% by weight | | 80.0 | |
| A 98:2 ViAc:glycidyl acrylate aqueous emulsion copolymer having a resin solids content of 50%, by weight | | | 80.0 |
| A 70%, by weight, aqueous solution of trimethylolphenol | 20.0 | 20.0 | 20.0 |
| Chromic nitrate | 5.0 | 5.0 | 5.0 |

Each of these formulations was used in the preparation of birch wood plywood panels by means of the procedure described in Example I. However, when subjected to the cyclic boil test for type I hardwood plywood and the cold soak test for type II hardwood plywood, it was noted that only the plywood which had been bonded with Formulation #3, i.e. the adhesive of our invention, succeeded in passing both tests while the plywood which had been bonded with Formulations #1 and 2 did not pass either test.

*Example V*

This example illustrates the use of a variety of catalysts and reactive materials in the adhesive formulations of our invention.

Below are listed a number of catalysts and a number of reactive materials which were substituted, respectively, for the chromic nitrate and trimethylol phenol which were used in the adhesive formulation of Example I. Each of the adhesive formulations prepared with these equivalent materials was employed in the preparation of birch wood plywood specimens which were all comparable in their properties to the product described in Example I.

Catalysts: hydrochloric acid, nitric acid, sulfuric acid, paratoluene sulfonic acid, benzene sulfonic acid, trichloroacetic acid, acetic acid, ammonium chloride, zinc nitrate, ammonium paratoluene sulfonate, ammonium dihydrogen phosphate, ammonium nitrate, manganese nitrate, aluminum chloride, aluminum nitrate, and para-aminobenzoatochromic chloride.

Reactive materials: resorcinol, B-stage resorcinol-formaldehyde resins, and reactive bark derivatives containing water soluble sulfonate salts of hydroxy aromatic polymeric compounds.

*Example VI*

This example illustrates the rapid setting properties of our novel adhesives in comparison with conventional thermosetting adhesives.

Below are listed a number of adhesive formulations which were prepared.

| Formulation | Parts | | |
|---|---|---|---|
| | 1 | 2 | 3 |
| A 98:2 vinyl acetate:glycidyl acrylate aqueous copolymer emulsion having a resin solids content of 50%, by weight | 100 | | |
| A 70%, by weight, aqueous solution of trimethylol phenol | 16 | | |
| Chromic nitrate | 5 | | |
| A resorcinol-formaldehyde resin aqueous dispersion having a resin solids content of 50% by weight [1] | | 100 | |
| Paraformaldehyde (catalyst) | | 5 | |
| A melamine-formaldehyde resin aqueous dispersion having a resin solids content of 50% by weight [2] | | | 100 |

[1] In the preparation of the resorcinol-formaldehyde resin, 2500 parts of resorcinol were mixed with 500 parts of a 37% aqueous formaldehyde solution and heated with stirring to about 100° C. to form a homogeneous solution. An additional 750 parts of a 37% aqueous formaldehyde solution were then slowly added with vigorous stirring. After the formaldehyde had been added, 15 parts of oxalic acid were introduced, and the product was then diluted with 2600 parts of water.

[2] In the preparation of the melamine-formaldehyde resin, 2 to 5 moles of formaldehyde were reacted with 1 mole of melamine in an aqueous solution. After a reaction period of 1 hour, the product was dried. Prior to use, the dried product was dispersed in water and 10%, by weight, of wood flour was added.

A 6 mil wet film from each of Formulations #2 and 3 was then applied to both surfaces of five 6" x 6" x 1/16" birch wood veneers while a 6 mil wet film from Formulation #1 was applied to only one surface of five birch wood veneers of similar dimensions. After being allowed to air dry for five minutes, the three sets of five veneers which were bonded, respectively, with the adhesives of Formulations #1, 2 and 3, were then mated and pressed for thirty minutes at a pressure of 100 p.s.i. and a temperature of 72° F., i.e. room temperature.

After being removed from the press, it was noted that the five veneers coated with Formulation #1, i.e. the adhesive of our invention, had been securely laminated into a solid structure which was readily handled without any danger of delamination. After seven days this laminate withstood the cyclic boil test for type I hardboard plywood as well as the cold soak test for type II hardwood plywood.

In contrast, when the veneers which had been coated with Formulations #2 and 3 were removed from the press, it was noted that, in each case, there was a complete absence of bonding between the individual veneers. Moreover, it was found that in order to achieve room temperature bonding comparable to that obtained with Formulation #1, it was necessary, in the case of Formulation #2, to retain the veneers in the press for at least 8 hours. In the case of Formulation #3, a room temperature cure could not be obtained and it was necessary to press these veneers for ½ hour at a temperature of at least 200° F. in order to achieve bonding.

Summarizing, our invention is thus seen to provide novel, rapid setting thermosetting adhesive compositions capable of yielding high strength, water resistant bonds suitable for exterior applications. Variations may be made in proportions, procedures, and materials without departing from the scope of this invention as defined by the following claims.

We claim:

1. An aqueous adhesive composition comprising (a) an emulsion copolymer of vinyl acetate with a comonomer selected from the group consisting of glycidyl acrylate and glycidyl methacrylate and (b) trimethylol phenol.

2. The adhesive composition of claim 1, wherein said emulsion copolymer contains from 0.1% to 10%, by weight, of said comonomer selected from the group consisting of glycidyl acrylate and glycidyl methacrylate.

3. The adhesive composition of claim 1, wherein said composition contains from 20% to 99.9%, by weight, of the vinyl acetate copolymer resin solids, and from 0.1% to 80%, by weight, of trimethylol phenol, the total solids content being about 30% to about 60%, by weight, of the total composition.

4. The adhesive composition of claim 1, wherein a catalyst is present in an amount ranging from 0.1 to 10 parts per 100 parts of the combined total weight of the trimethylol phenol and the vinyl acetate copolymer resin solids, said catalyst being selected from the group consisting of hydrochloric acid, nitric acid, sulfuric acid, paratoluene sulfonic acid, acetic acid, benzene sulfonic acid, trichloracetic acid, chromic nitrate, zinc nitrate, ammonium paratoluene sulfonate, ammonium dihydrogen phosphate, aluminum chloride, ammonium nitrate, manganese nitrate, aluminum nitrate, and paraaminobenzoatochromic chloride.

5. An aqueous adhesive composition comprising from 20% to 99.9%, by weight, of vinyl acetate emulsion copolymer resin solids, wherein said copolymer contains from 0.1% to 10%, by weight, of a comonomer selected from the group consisting of glycidyl acrylate and glycidyl methacrylate, and from 0.1% to 80%, by weight, of a low molecular weight reactive material consisting of trimethylol phenol.

6. A laminate comprising at least two laminae which are adhesively bound with a film consisting of a dried residue of an aqueous adhesive composition comprising (a) an emulsion copolymer of vinyl acetate with a comonomer selected from the group consisting of glycidyl acrylate and (b) trimethylol phenol.

7. A substrate coated with a film consisting of a dried residue of an aqueous adhesive composition comprising (a) an emulsion copolymer of vinyl acetate with a comonomer selected from the group consisting of glycidyl acrylate and glycidyl methacrylate and (b) trimethylol phenol.

8. A porous substrate saturated with an adhesive binder consisting of a dried residue of an aqueous adhesive composition comprising (a) an emulsion copolymer of vinyl acetate with a comonomer selected from the group consisting of glycidyl acrylate and glycidyl methacrylate and (b) trimethylol phenol.

References Cited by the Examiner

UNITED STATES PATENTS

| | | | |
|---|---|---|---|
| 2,781,335 | 2/1957 | Cupery | 260—86.1 |
| 2,902,458 | 9/1959 | Teppema | 260—29.3 |
| 3,041,301 | 6/1962 | Armour | 260—29.3 |

WILLIAM H. SHORT, *Primary Examiner.*

JAMES A. SEIDLECK, SAMUEL H. BLECH, J. NORRIS, *Assistant Examiners.*